March 15, 1960  M. L. JONES  2,928,956
ELECTRONIC OVERLOAD PROTECTION FOR PULSED SYSTEMS
Filed Jan. 7, 1959
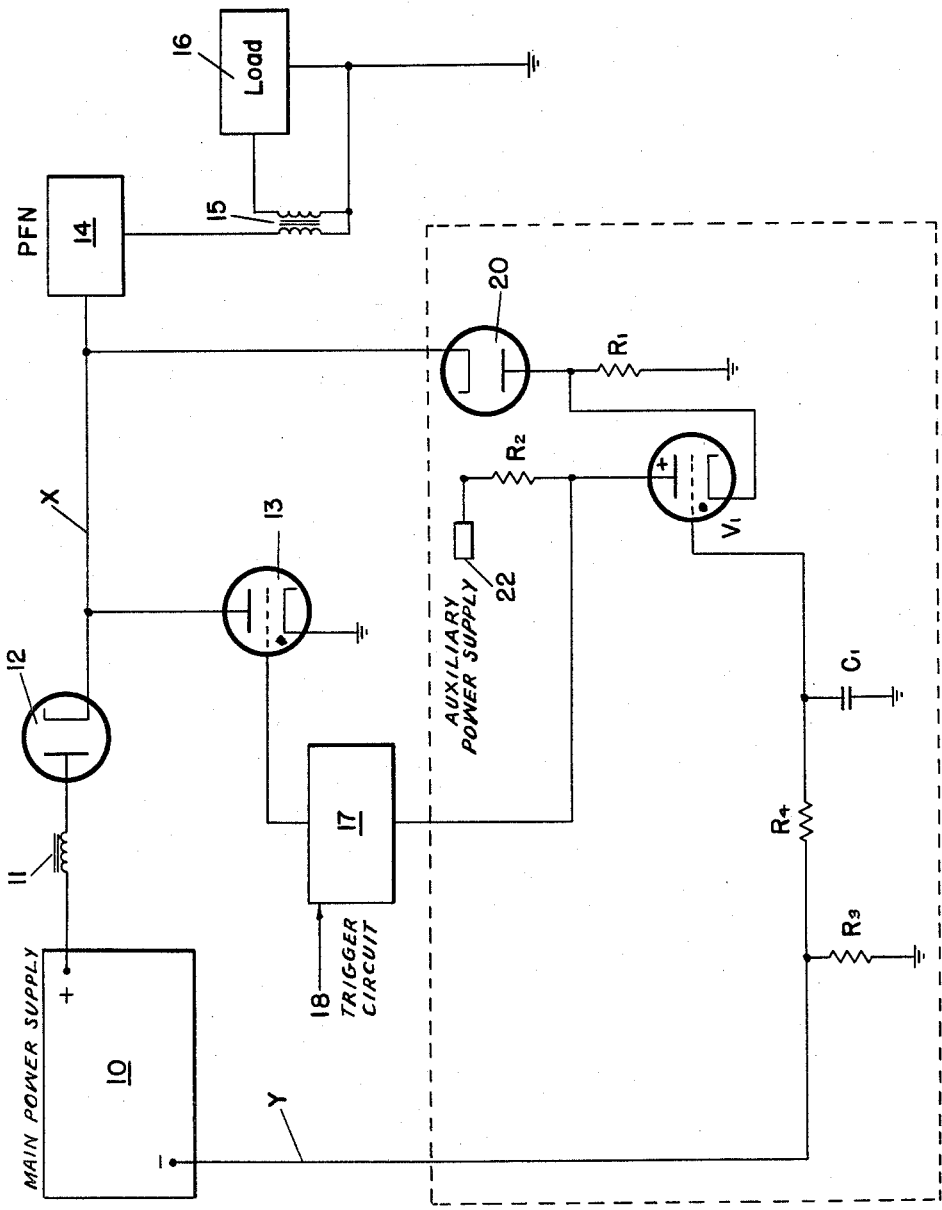
INVENTOR.
MARTIN L. JONES
BY
*J. J. Sheehan*
ATTORNEY

United States Patent Office 2,928,956
Patented Mar. 15, 1960

2,928,956

ELECTRONIC OVERLOAD PROTECTION FOR PULSED SYSTEMS

Martin L. Jones, Baltimore, Md., assignor, by mesne assignments, to the United States of America as represented by the Secretary of the Navy Application January 7, 1959, Serial No. 785,544

3 Claims. (Cl. 307—93)

This invention relates to line type pulsing systems and more particularly to a shunt circuit for preventing damage to circuit components by arc-back or reverse flow currents. Transient voltages such as are caused by reverse flow currents are indicative of or are in effect intermittent short-circuited load conditions, and consequently electrical energy from a power supply which normally would be absorbed by the load is reflected back into the pulse forming circuitry. As a result of the reverse flow currents, the tubes and other components of the circuitry are subjected to possible damage.

The present invention accomplishes the desired control of such transient voltages by providing a circuit which shunts the pulse forming circuitry and utilizes the energy of the transient voltages of the reverse currents to cut-off or prevent further operation of the pulse power supply. The invention is especially useful in systems which are supplied with pulses of short duration and where the energy in a single pulse is not of sufficient magnitude to damage the tubes or other circuitry components but the cumulative effect of the reverse flow currents of a series of pulses would cause damage.

The broad object of this invention is to protect pulse circuitry components in a pulsing system against damage by excessive reverse flow voltages.

Another object of the invention is to utilize reverse flow currents in a pulsing system for detecting faults in the system.

Another object is to utilize the reverse flow currents in a pulsing system to cut off the pulsing source when a fault exists in the system.

Another object is to provide a circuit to effect the above objects whether the pulse source is constant or variable.

These and other objects and features of the invention will become apparent upon consideration of the following detailed description taken together with the accompanying drawing which is a schematic representation of the preferred embodiment of the invention.

In the figure, a source of D.C. power 10 of selected potential is in a series loop through transmission line X with a modulator including a charging choke 11, charging diode 12, pulser thyratron 13, pulse forming network (PFN) 14 and the primary of pulse transformer 15. The PFN 14 is discharged through the primary of transformer 15 to the secondary of the transformer which is connected to a load 16 and which may, for example, be an amplifier. The thyratron 13 is provided with a customary trigger circuit indicated at 17 and has an input at 18.

The shunt circuitry of the invention is shown in the broken line rectangular blocked portion of the drawing and includes a diode 20 having its cathode connected to transmission line X and its plate grounded through resistor $R_1$, so that in case of a load fault current will be reversed from the the load through the transmission line X and produce a negative pulse across $R_1$. This negative voltage is applied between the cathode and ground of thyratron $V_1$ and develops a positive grid to cathode pulse through bypass capacitor $C_1$ causing the thyratron $V_1$ to conduct. The resulting voltage drop across resistor $R_2$ reduces the plate voltage which is supplied by an auxiliary power supply 22 to the trigger circuit 17 and provides the control for operation of the pulser thyratron 13 through the trigger circuit 17. By proper selection of the value of $R_2$ the voltage to the trigger circuit 17 may be sufficiently reduced to disable the trigger circuit.

In order to provide a circuit having a sensitivity which is independent of normal operating power level, a sample of the average current which is supplied by power source 10 may be developed across resistor $R_3$ through the Y transmission line and filtered by resistor $R_4$ and capacitor $C_1$ and then applied, as shown, as a bias to the grid of $V_1$. The relative values of $R_1$ and $R_3$ will be selected to satisfy the sensitivity requirements. If the operating power level is controlled by varying the supply voltage from power supply 10, the overload sensitivity will remain substantially constant.

Assume the thyratron $V_1$ triggers at zero bias and overload protection is required for any fault condition that produces a reverse shunt diode current exceeding 50% of the available maximum. Proper operation, for these conditions, would require that $R_1$ and $R_3$ be proportioned so that the bias voltage across $R_3$ will equal the peak voltage across $R_1$ when the shunt diode 20 is operating at 50% of available maximum current.

While a specific embodiment of the invention has been shown and described, it is to be understood that other modifications may be made without departing from the spirit of the invention. The appended claims are, therefore, intended to cover any modifications made within the scope of the invention.

I claim:

1. In an electrical system having a main power supply, a modulator in circuit therewith and including a pulser thyratron having a trigger circuit and a line supplying the output of the modulator to a load in combination with means for protecting said modulator from reverse currents which comprises a diode having its cathode connected to said line to conduct the reverse currents from the load and produce a negative pulse, a first resistor connected to the plate of said diode, a second thyratron, a connection between said diode plate and first resistor to the cathode of said second thyratron to apply said negative voltage, a second power supply and a second resistor in series with the plate of said second thyratron and a capacitor connected to the grid of the second thyratron to develop a positive grid to cathode pulse, and a connection from the plate of the second thyratron to the trigger circuit for controlling the operation of the pulser thyratron.

2. In an electrical system having a main power supply, a modulator in circuit therewith and including a pulser thyratron having a trigger circuit and a line supplying the output of the modulator to a load in combination with means for protecting said modulator from reverse currents which comprises a diode having its cathode connected to said line to conduct the reverse currents from the load and produce a negative pulse, a first resistor connected to the plate of said diode, a second thyratron, a connection between said diode plate and first resistor to the cathode of said second thyratron to apply said negative voltage, a second power supply and a second resistor in series with the plate of said second thyratron and a capacitor connected to the grid of the second thyratron to develop a positive grid to the cathode pulse, a connection from the cathode of the second thyratron to the trigger circuit for controlling the operation of the pulser thyratron and resistor means between said capacitor and the main power supply to provide a circuit having a sensitivity which is independent of the power level of the main power supply.

3. In an electrical system having a main power supply, a modulator in circuit therewith and including a pulser thyratron having a trigger circuit and a line supplying the output of the modulator to a load in combination with means for protecting said modulator from reverse currents which comprises a diode having its cathode connected to said line to conduct the reverse currents from the load and produce a negative pulse, a first resistor connected to the plate of said diode, a second thyratron, a connection between said diode plate and first resistor to the cathode of said second thyratron to apply said negative voltage, a second power supply and a second resistor in series with the plate of said second thyratron and a capacitor connected to the grid of the second thyratron to develop a positive grid to the cathode pulse, a connection from the cathode of the second thyratron to the trigger circuit for controlling the operation of the pulser thyratron and resistor means between said capacitor and the main power supply for sampling the power output and for applying the output as a bias to the grid of the second thyratron.

References Cited in the file of this patent
UNITED STATES PATENTS
2,832,900    Ford _____ Apr. 29, 1958